UNITED STATES PATENT OFFICE.

GEORGE E. HIPP, OF BUFFALO, NEW YORK.

PROCESS OF MANUFACTURING MURIATIC ACID.

SPECIFICATION forming part of Letters Patent No. 726,533, dated April 28, 1903.

Application filed April 14, 1902. Serial No. 102,898. (No specimens.)

*To all whom it may concern:*

Be it known that I, GEORGE E. HIPP, a citizen of the United States, residing at Buffalo, in the county of Erie and State of New York, have invented a new and useful Process for Manufacturing Muriatic Acid; and I do hereby declare that the following is a full, clear, and exact description of the invention, which will enable others skilled in the art to which it pertains to make and use the same.

This invention relates to a process of manufacturing muriatic acid by compounding niter cake (sodium bisulfate) in dissolved form and a sulfid of an alkali metal, then boiling, clarifying, and concentrating the compound, then adding salt, thoroughly blending the entire mass, and finally calcining the same, which produces salt cake—a by-product—free from arsenic, selenium, lead, and insoluble matter.

The objects of this invention are to render the process of manufacturing muriatic acid, and salt cake—a by-product—more economical, cheaper, and more expeditious than has heretofore been possible, to extract all arsenic and selenium (which are very injurious) from muriatic acid, and also from the salt cake, with the additional extraction of lead from the latter.

In carrying out my process I take one hundred pounds of niter cake, (sodium bisulfate,) which is composed of sulfuric acid 33.33 per cent., sodium sulfate fifty-nine per cent., insoluble matter 0.37 per cent., and water 7.40 per cent. This cake I dissolve in water, and when solution is completed it is diluted, if found necessary. A quantity of a sulfid of an alkali metal is then added—say, for example, about one and one-half pounds—which liberates the sulfid of hydrogen contained therein by the action thereon of the acid in the dissolved niter cake. The sulfid of hydrogen thus formed and liberated precipitates the arsenic, selenium, and lead as insoluble compounds. The solution is now boiled to completely liberate the hydrogen sulfid, after which it is clarified by extracting the insoluble matter, consisting of sulfate of lead, arsenic, and selenium sulfid, the insoluble matter which the niter-cake generally contains, (silica,) and free sulfur formed during the decomposition of hydrogen sulfid. The clarified solution is then concentrated to from 66° to 70° Baumé and introduced into a furnace. A chlorid of an alkali metal (salt)— about thirty-nine and eight-tenths pounds— is next added and the whole thoroughly blended and calcined. During calcination the acid of the niter cake serves to decompose the salt, liberating hydrochloric-acid gas, which is free from arsenic and selenium, and from this gas, as is well known, muriatic acid is produced, and since all arsenic and selenium are extracted from the gas none will be found in the acid produced thereby. After the hydrochloric-acid gas is diffused the calcined mass, known as "salt cake"—a by-product—is free from arsenic and selenium and also free from lead and insoluble matter, which would otherwise remain in undecomposed form.

What I claim is—

1. The process of manufacturing muriatic acid, which consists in first dissolving niter cake, then adding a quantity of a sulfid of an alkali metal, then boiling, clarifying and concentrating the solution, and finally heating and adding a chlorid of an alkali metal, the whole being thoroughly blended and calcined, substantially as and for the purpose described.

2. The process of manufacturing muriatic acid, which consists of first dissolving niter cake, then adding a quantity of a sulfid of an alkali metal to precipitate the arsenic and selenium, then boiling the solution to liberate the sulfid-hydrogen gas, next clarifying the same to extract the insoluble matter, then concentrating to about 68° Baumé, and finally introducing the solution into a furnace, adding a chlorid of an alkali metal, and blending and calcining the whole, substantially as set forth.

3. The herein-described process of manufacturing muriatic acid, which consists in first dissolving niter cake composed of sulfuric acid 33.33 per cent.; sulfate soda fifty-nine per cent.; arsenic, selenium, lead and insoluble matter 0.27 per cent., and water 7.40 per cent., then adding a quantity of a sulfid of an alkali metal, then boiling, clarifying, and concentrating the same, then introducing the same into a furnace and adding 39.8 pounds of salt, and finally thoroughly blending and calcining the same, all in the proportions described, substantially as set forth.

In witness whereof I affix my signature in the presence of two subscribing witnesses.

GEORGE E. HIPP.

Witnesses:
CHAS. F. BURKHART,
EMIL NEUHART.